Jan. 10, 1967  F. R. MORTIMER  3,296,742

LOCKING AND SEALING DEVICES

Filed May 12, 1964  3 Sheets-Sheet 1

Jan. 10, 1967   F. R. MORTIMER   3,296,742
LOCKING AND SEALING DEVICES
Filed May 12, 1964   3 Sheets-Sheet 3

United States Patent Office 3,296,742
Patented Jan. 10, 1967

3,296,742
LOCKING AND SEALING DEVICES
Frank Radcliffe Mortimer, Coventry, England, assignor to Dunlop Rubber Company, Limited, Erdington, England, a corporation of Great Britain
Filed May 12, 1964, Ser. No. 366,815
Claims priority, application Great Britain, May 17, 1963, 19,618/63
9 Claims. (Cl. 49—319)

This invention relates to a locking and sealing device.

In a number of applications, such as in the provision of doors or windows for vehicles or aircraft, it is necessary for a closure member to be lockable in sealing engagement with a surround member.

In the case of a closure member in the form of an aircraft door, for example, locking means in the form of a series of hydraulically operated bolts may be provided. A sealing means for the door may comprise an inflatable tube attached to the door surround and expansible by inflation to sealingly engage the door.

The object of the present invention is to provide a combined locking and sealing device, particularly, but not exclusively, for aircraft doors.

According to the invention a combined locking and sealing device for a closure member and a surround member comprises a rigid latch which is movable in the closed state of the members to secure the members releasably together, and sealing means for location between the members, the sealing means being expansible to provide a seal between the members and the arrangement being such that expansion of the sealing means moves the latch to a position in which it secures the members together.

According to the invention also, a combined locking and sealing device for a closure member and a surround member comprises a rigid latch for attachment to one of the members so as to be movable in the closed state of the members into engagement with retaining means on the other member to secure the members releasably together, and sealing means for location between the members, the sealing means being expansible to provide a seal between the members and the arrangement being such that expansion of the sealing means moves the latch to a position in which it secures the members together.

The invention also provides an aircraft door surround comprising a combined locking and sealing device as defined in either of the two preceding paragraphs, a plurality of locking units being provided in spaced-apart positions around the door surround and arranged to be operated by an inflatable sealing tube extending around the periphery of the door.

In a preferred arrangement, the locking means is attached to a door surround, and comprises a latch which is movable into engagement with retaining means in the form of a recess in the edge of an associated door. The latch is movable into the recess by expansion of a pneumatic sealing tube, also located in the door surround and positioned so that expansion of the tube first forces the latch into engagement with the door and then itself makes sealing engagement with a surface of the door.

The latch may take the form of a pivoted plate provided with a spring toggle mechanism to maintain the plate either in the locked or in the released position.

One embodiment of the invention will now be described by way of example, with reference to the accompanying drawings, in which.

Figure 1:
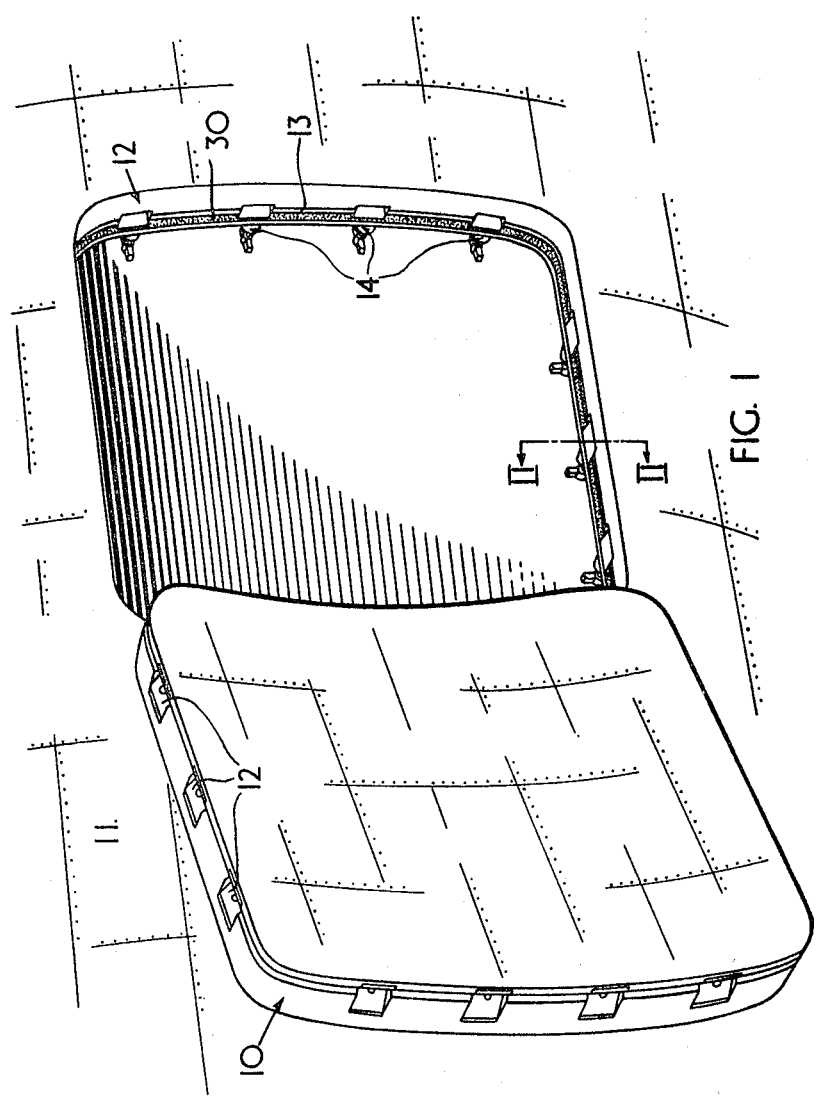
FIGURE 1 is a perspective view of an open aircraft door and its surround, incorporating a locking and sealing device in accordance with the invention.

A door 10 fitted to an aircraft fuselage 11 is pivoted at one side to a vertical side of a door surround 12. The door surround 12, which forms part of the fuselage of the aircraft, is provided around the whole of its periphery with a channel 13 (FIGURES 1, 2 and 3) of generally U-shaped cross-section, the open side of the channel facing towards the door opening. A number of locking units 14 are provided at spaced positions around the periphery of the door opening; these are all similar, and one only will therefore be described.

Each locking unit comprises a latch 15 consisting of a metal plate 16 pivoted in a cylindrical socket 17 about an axis parallel to the plane of the plate and aligned with the peripheral direction of the adjacent portion of the door surround. The plate 16 is formed integrally with an arm 18 extending approximately at right angles to the plate 16 so that the latch 15 is generally L-shaped in cross-section.

The arm 18 is linked to a connecting rod 19 by a joint formed by a pair of pins 20 fixed to the rod and slidably engaging opposite sides of the arm 18. The rod 19 can be moved manually by a handle 21 to turn the arm 18 and thus the whole latch 15 from the position shown in FIGURE 2 to the position shown in FIGURE 3, and vice versa.

Figure 2:
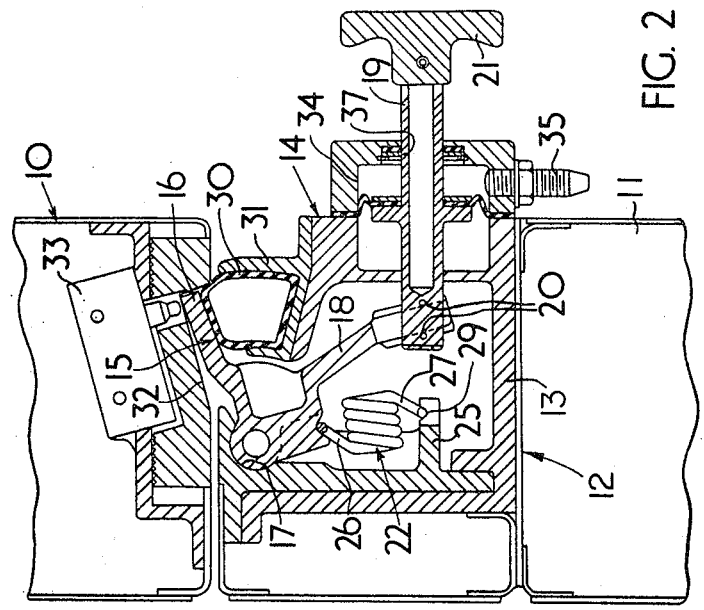
FIGURE 2 is a cross-sectional view, taken on the line II—II of FIGURE 1, showing the door closed and a locking unit in its locked position.
Figure 3:
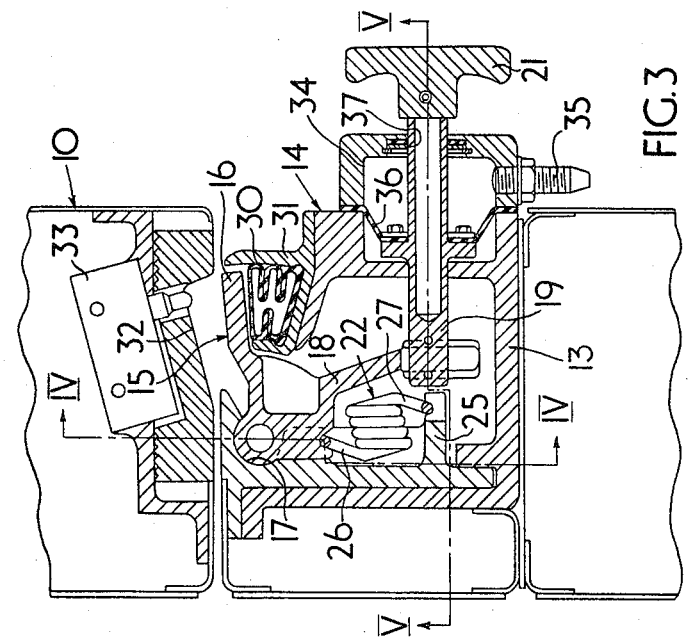
FIGURE 3 is a similar view to FIGURE 2 showing the released position of the locking unit.
Figure 5:
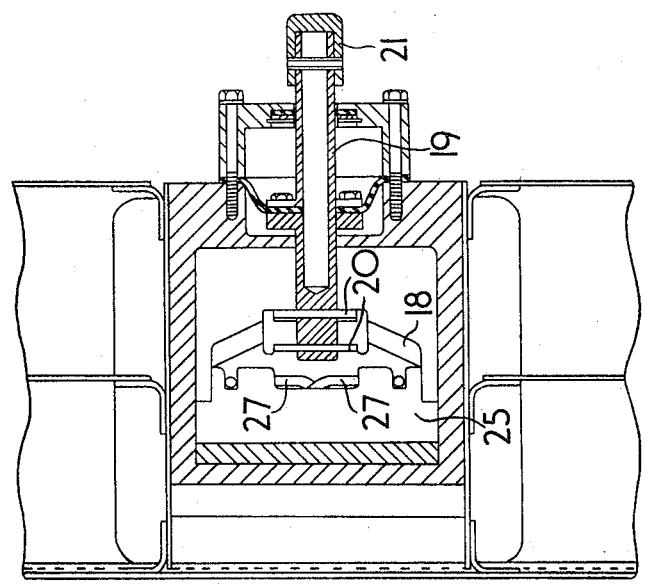
FIGURE 5 is a sectional view on the line V—V of FIGURE 3.
Figure 4:
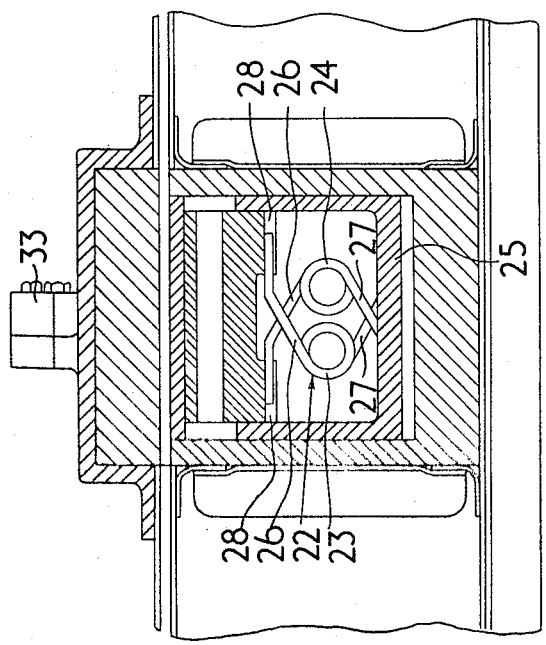
FIGURE 4 is a sectional view on the line IV—IV of FIGURE 3.

The latch 15 is provided with a spring toggle mechanism 22 which tends to retain the latch in either the locked position as shown in FIGURE 2 or the released position as shown in FIGURE 3. The toggle mechanism 22 consists of a pair of similar coil springs 23 and 24 which are mounted in torsion between the movable latch and a fixed flange 25 which forms part of the lock housing. The arms 26, 27 of each spring are located, respectively, in grooves 28, 29 formed in the arm 18 and the flange 25, and are forced together before assembly so that they exert a considerable force in the direction of a line in the plane of FIGURES 2 and 3 joining the grooves 28, 29. In FIGURE 2 it will be seen that the line of action of the spring thrust will tend to maintain the latch 15 in the locked position, whereas in the position shown in FIGURE 3 the line of action of the spring thrust is such that it tends to maintain the latch 15 in the released position.

An inflatable rubber tubular sealing member 30 is located in the channel 13 and extends around the whole periphery of the door opening. Means is provided for inflating the member 30 and for releasing air therefrom in the normal manner. The sealing member 30 is restrained by a guide 31 as it passes through each locking unit and is arranged so that when the door 10 is in its closed position and the sealing member 30 is inflated it will first contact the underside of the adjacent plate 15 of the latch to move it outwardly from the channel 13 into engagement with an associated recess 32 in the door to lock the door in position and will then, on further expansion, itself contact a surface of the door and seal the gap between the door and its surround as shown in FIGURE 2. The spring toggle simultaneously moves to its overcentre position to retain the latch in the locked position. A limit switch 33 is provided for engagement by the latch and is connected in an electrical signalling circuit which gives an indication to the pilot of the aircraft when all the locking units are in the locked state.

The latch 15 is movable, on release of pressure from the sealing tube 30, from the locked position to the unlocked position by means of pneumatic pressure applied to a chamber 34 of the locking unit 14 through an inlet 35. The connecting rod 19 is airtightly fastened to a diaphragm 36 which forms one wall of the chamber 34, and is slidable in an air-tightly sealed bore 37 in the other wall of the chamber 34. When pressure is applied to the chamber 34 the rod 19 is moved to the position shown in FIGURE 3, moving the latch to the released position.

The chambers 34 of the locking units are all connected together so that they can be supplied with pneumatic pressure for simultaneous operation to move their respective latches to the released position and the chambers can also be simultaneously connected to atmosphere to permit movement of the latches to the locked position.

While the device described above is pneumatically operated it could alternatively be operated by hydraulic pressure. It can also be operated manually by the handle 21.

The combined locking and sealing device in accordance with the invention has the advantage that only one fluid-pressurised system is required for both locking and sealing. The device is compact and inexpensive, and is readily adaptable to doors of various shapes.

Having now described my invention, what I claim is:

1. A combined locking and sealing means for a closure member and a surround member comprising a rigid latch attached to one of said members, and adapted to engage the other member to secure said closure member in a locked closed position, sealing means which is expandable and disposed around said closure member, said sealing means being expandable to effect movement of the latch to a latch closing position, said sealing means being in the form of an inflatable tube which is located to seal a clearance around confronting surfaces of said closure member and surround member, said latch being pivotally movable by expansion of said inflatable tube to be brought into locking relation between said closure member and said surround member.

2. A combined locking and sealing means according to claim 1 wherein a spring toggle mechanism is provided to hold the latch in its locked position and in its released position.

3. A combined locking and sealing means as claimed in claim 1 including a plurality of rigid latches in spaced-apart positions around the door surround and arranged to be operated by said inflatable sealing tube extending around the periphery of the door surround.

4. A combined locking and sealing means according to claim 1 wherein the latch comprises a plate pivotally attached to one of said members, and said inflatable tube is disposed in back of each plate so that expansion of said tube will turn said plate outwardly with respect to the member to which it is attached.

5. A combined locking and sealing means according to claim 1 including means for turning said plate to retract it from the associated retaining means on the other member, said means comprising a connecting rod operatively connected to an arm of said plate.

6. A combined locking and sealing means according to claim 5 wherein fluid pressure actuated means is provided for moving the connecting rod to release the latch.

7. A combined locking and sealing means according to claim 6 wherein the fluid pressure actuated means comprises a chamber through which the rod is fluid-tightly slidable and one wall of which is formed by a flexible diaphragm fluid-tightly attached to the rod, means being provided for supplying fluid under pressure to the chamber.

8. A combined locking and sealing means according to claim 7 wherein the rod is arranged to be movable manually to move the latch.

9. A combined locking and sealing means according to claim 8 wherein a spring is provided to hold the latch in its locked position.

References Cited by the Examiner
UNITED STATES PATENTS 2,763,038  9/1956  Hagerty et al. _____ 20—69

FOREIGN PATENTS 260,115  10/1926  Great Britain.
499,035  1/1939  Great Britain.
905,808  9/1962  Great Britain.

HARRISON R. MOSELEY, *Primary Examiner.*

W. E. HEATON, P. C. KANNAN, *Assistant Examiners.*